United States Patent
Wismann et al.

(10) Patent No.: US 8,333,258 B2
(45) Date of Patent: Dec. 18, 2012

(54) METHOD AND APPARATUS FOR ADJUSTING THROTTLE CONTROL SIGNALS IN ELECTRIC VEHICLES

(75) Inventors: Brian J. Wismann, Talent, OR (US); Aaron Bland, Ashland, OR (US); Daniel M. Riegels, Ashland, OR (US); Lawrence O. Hilligoss, Ashland, OR (US); Craig A. Bramscher, Ashland, OR (US); Charles R. Lee, Talent, OR (US)

(73) Assignee: Brammo, Inc., Ashland, OR (US)

( * ) Notice: Subject to any disclaimer, the term of this patent is extended or adjusted under 35 U.S.C. 154(b) by 401 days.

(21) Appl. No.: 12/552,120

(22) Filed: Sep. 1, 2009

(65) Prior Publication Data

US 2011/0048832 A1    Mar. 3, 2011

(51) Int. Cl.
*B62K 23/00* (2006.01)
*B62K 23/02* (2006.01)

(52) U.S. Cl. .......... 180/315; 701/22; 180/220; 180/335; 180/336

(58) Field of Classification Search ............. 180/65.1, 180/65.285, 65.8, 220, 335, 336, 315; 123/339, 123/400; 701/22
See application file for complete search history.

(56) References Cited

U.S. PATENT DOCUMENTS

| | | | | |
|---|---|---|---|---|
| 1,832,018 A * | 11/1931 | Gossard Sarah L | ........ | 180/220 |
| 3,554,311 A * | 1/1971 | Thompson et al. | ........ | 180/220 |
| 4,884,651 A * | 12/1989 | Harada et al. | ........ | 180/197 |
| 6,044,318 A * | 3/2000 | Bourdon et al. | ........ | 701/65 |
| 6,155,369 A * | 12/2000 | Whittaker | ........ | 180/220 |
| 6,978,694 B2 * | 12/2005 | Peppard | ........ | 74/489 |
| 2002/0108798 A1 * | 8/2002 | Huntsberger et al. | ........ | 180/220 |
| 2005/0115748 A1 * | 6/2005 | Lanier | ........ | 180/65.1 |
| 2007/0007064 A1 * | 1/2007 | Okamoto et al. | ........ | 180/220 |
| 2008/0114523 A1 * | 5/2008 | Dugas et al. | ........ | 701/101 |
| 2008/0211432 A1 * | 9/2008 | Shkondin | ........ | 318/8 |
| 2010/0025131 A1 * | 2/2010 | Gloceri et al. | ........ | 180/65.28 |
| 2012/0083958 A1 * | 4/2012 | Ballard | ........ | 701/22 |

FOREIGN PATENT DOCUMENTS

WO    WO 2007010300 A1 *    1/2007

OTHER PUBLICATIONS

Definition: "Motorcycle," Cambridge Dictionary Online—American English Dictionary, available at http://dictionary.cambridge.org/dictionary/american-english/motorcycle?q=motorcycle (last visited Apr. 3, 2012).*

* cited by examiner

*Primary Examiner* — Joseph Rocca
(74) *Attorney, Agent, or Firm* — Rajesh Vallabh; Foley Hoag LLP

(57) ABSTRACT

A control apparatus is provided for use in an electric vehicle having a throttle input device. The throttle input device is operable by a rider for generating a throttle signal for controlling the speed of the electric vehicle. The control apparatus, which adjusts the throttle signal, includes a rider input mechanism and a control device. The rider input mechanism can be manipulated by the rider to provide a given input. The control device is coupled to the rider input mechanism and to the output of the throttle input device. The control device adjusts the throttle signal based on the given input provided by the rider input mechanism.

23 Claims, 6 Drawing Sheets

METHOD AND APPARATUS FOR ADJUSTING THROTTLE CONTROL SIGNALS IN ELECTRIC VEHICLES

BACKGROUND

The present application relates generally to electric vehicles and, more particularly, to a method and apparatus for adjusting throttle signals from a throttle input device of an electric vehicle.

BRIEF SUMMARY OF EMBODIMENTS OF THE INVENTION

In accordance with one or more embodiments of the invention, a control apparatus is provided for use in an electric vehicle having a throttle input device. The throttle input device is operable by a rider for generating a throttle signal for controlling the speed of the electric vehicle. The control apparatus, which adjusts the throttle signal, includes a rider input mechanism and a control device. The rider input mechanism can be manipulated by the rider to provide a given input. The control device is coupled to the rider input mechanism and to the output of the throttle input device. The control device adjusts the throttle signal based on the given input provided by the rider input mechanism.

In accordance with one or more embodiments of the invention, a method of adjusting a throttle signal in an electric vehicle is provided. The electric vehicle includes a throttle input device operable by a rider for generating a throttle signal for controlling the speed of the electric vehicle. The method for adjusting the throttle signal includes the steps of: receiving a given input from a rider input mechanism manipulated by the rider; and adjusting the throttle signal based on the given input provided by the rider input mechanism.

Various embodiments of the invention are provided in the following detailed description. As will be realized, the invention is capable of other and different embodiments, and its several details may be capable of modifications in various respects, all without departing from the invention. Accordingly, the drawings and description are to be regarded as illustrative in nature and not in a restrictive or limiting sense, with the scope of the application being indicated in the claims.

DETAILED DESCRIPTION

Figure 1:
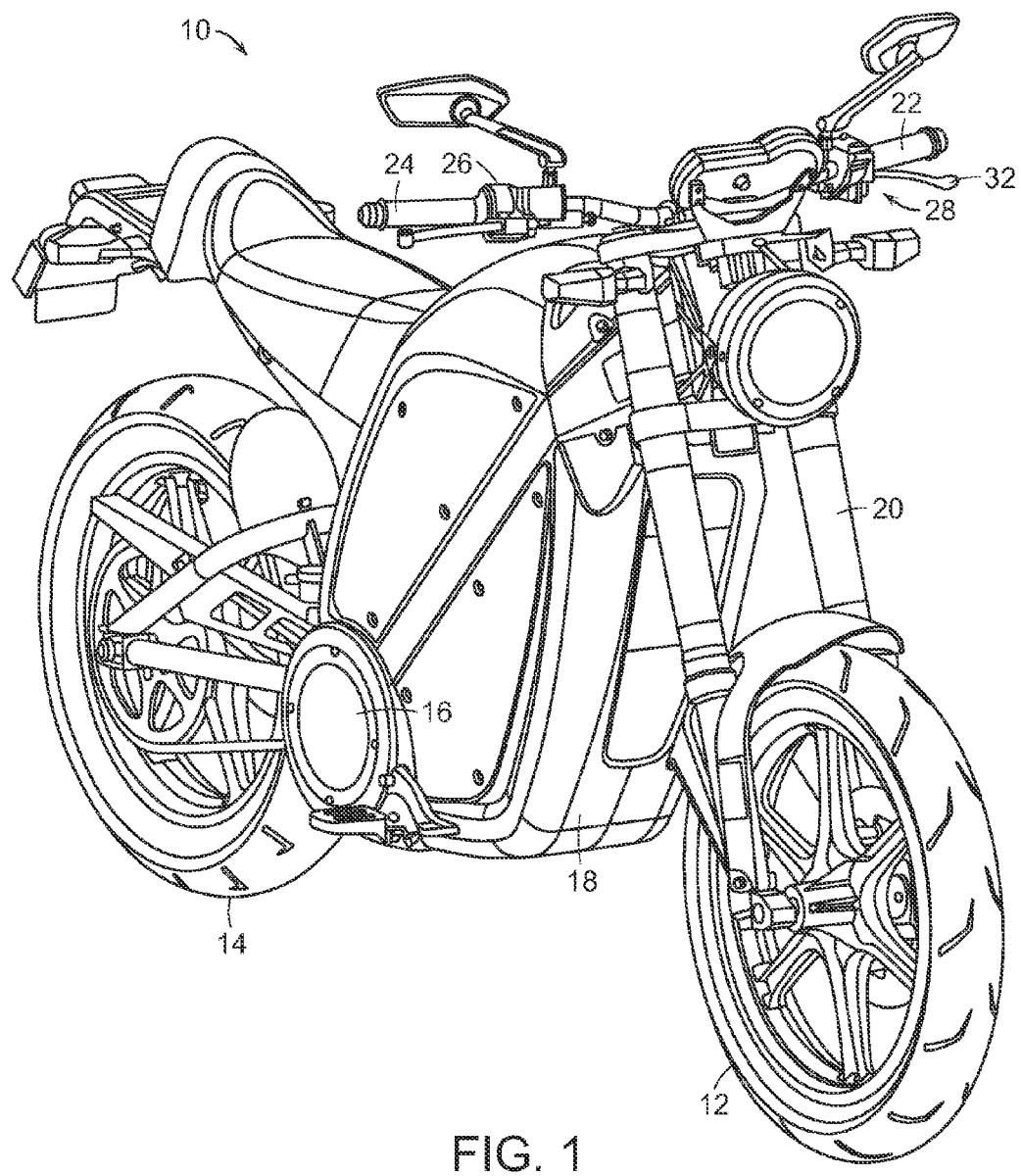
FIG. 1 is a perspective view of an exemplary electric vehicle in accordance with one or more embodiments of the invention.

FIG. 1 illustrates an example of an electric vehicle 10 (in this case an electric motorcycle) in accordance with one or more embodiments of the invention. The electric vehicle includes a front wheel 12, a rear wheel 14, an electric motor 16, and a main frame or chassis 18 interconnecting the front and rear wheels 12, 14. The electric vehicle 10 also includes a steering assembly 20 coupled to the frame 18. The steering assembly 20 is pivotable about a steering axis and includes a handlebar for imparting pivotal motion to the steering assembly.

The handlebar includes a left-side grip 22 and a right-side grip 24 that can be grasped by the rider to control the electric vehicle 10. The right side grip includes a throttle input device 26, which includes a throttle grip that the rider can twist to control the speed of the electric motor 16. In particular, twisting the throttle grip generates throttle signals proportional to the throttle grip twist. The throttle signals are transmitted to a motor controller, which controls operation of the electric motor 16 by controlling the amount of power supplied to the electric motor 16 from a battery power supply.

Figure 2:
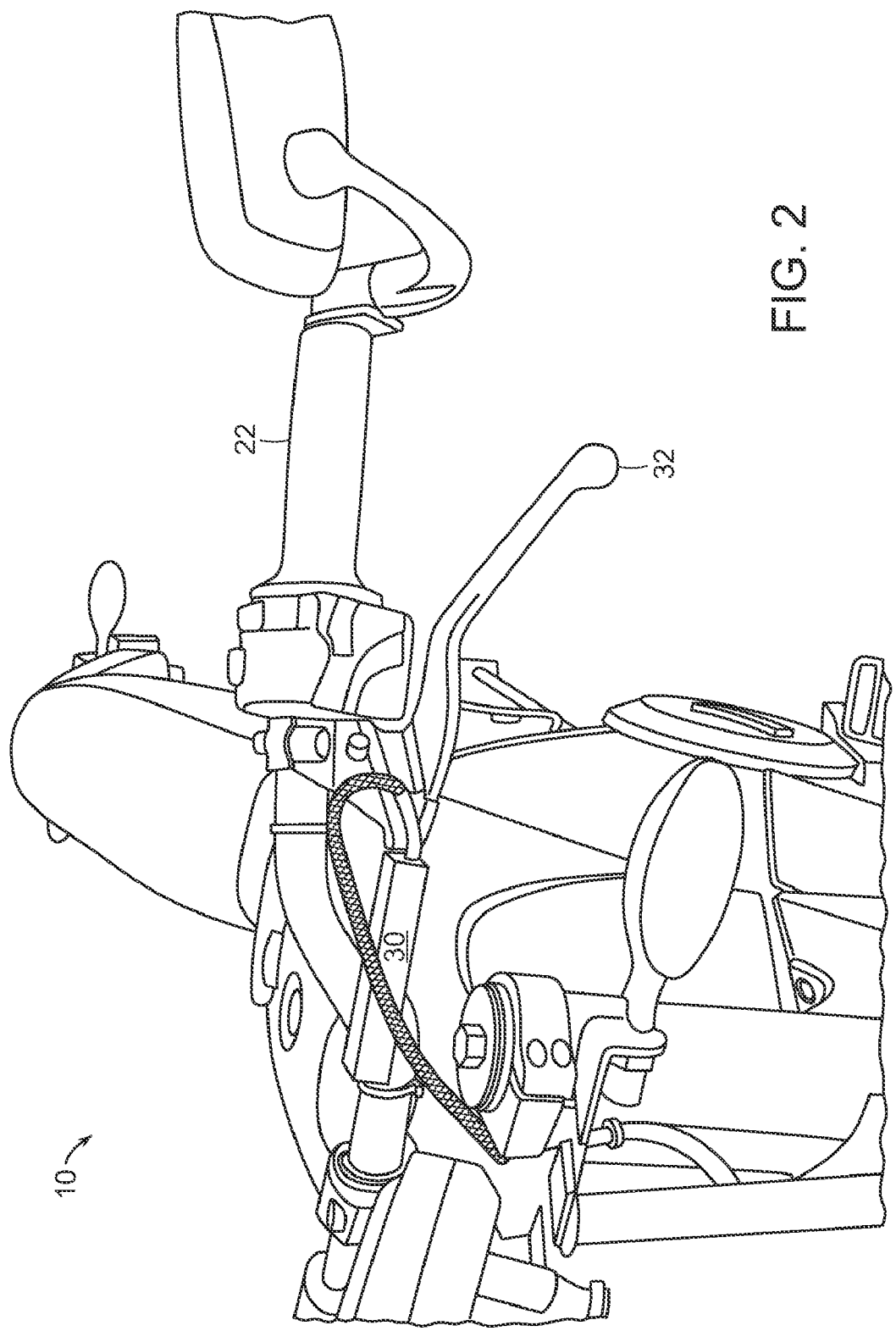
FIG. 2 is a perspective view of a control apparatus for adjusting throttle signals in accordance with one or more embodiments of the invention.

Mounted on the left side grip is a control apparatus 28 for adjusting the throttle signals from the throttle grip in accordance with one or more embodiments of the invention. The control apparatus 28 is shown in greater detail in FIG. 2. The control apparatus 28 includes a control device 30 and a rider input mechanism, in this case a lever 32 connected to the control device 30 by a cable 44. A rider can depress the lever 32 to cause the control device 30 to regulate the speed of the electric motor 16 based on the lever's position. The control device 30 electrically modifies the throttle signal from the throttle input device 26 on the opposite right side grip 24. The control apparatus 28 can also interrupt the throttle signal from the throttle input device 26 entirely when the lever 32 is fully depressed.

Figure 3:
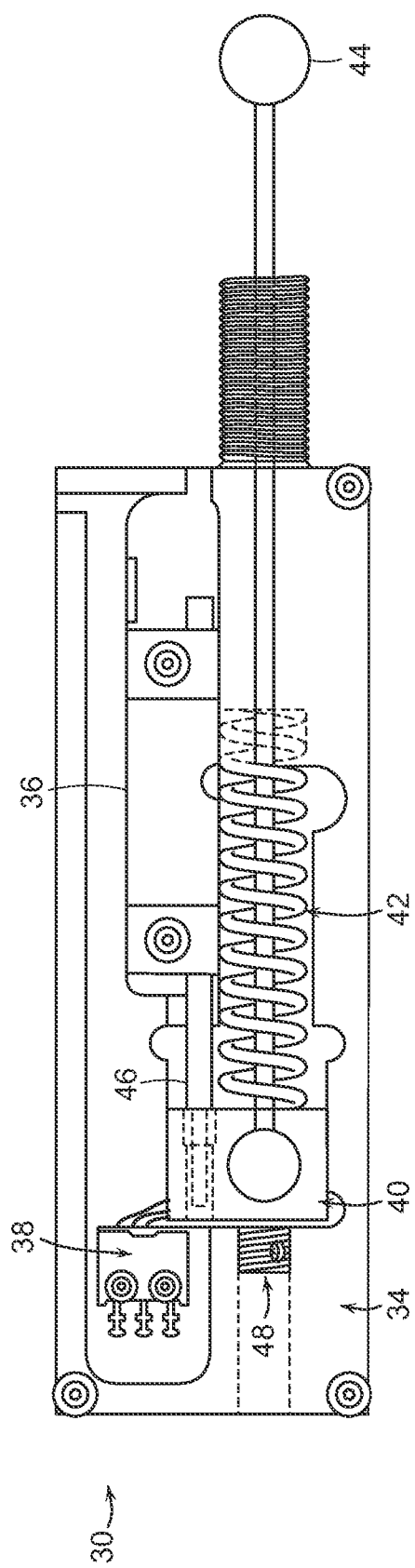
FIG. 3 is a top plan view of the control apparatus of FIG. 2 shown with its cover removed for purposes of illustration.

FIG. 3 is a top plan view of the control device 30 with its cover removed to better illustrate the components therein. The control device 30 includes a housing 34 containing a linear potentiometer 36, a small snap action switch 38, a slider 40, a compression spring 42, and the pull cable 44.

The linear potentiometer 36 is an electronic device that acts as a variable resistor. It includes a plunging shaft 46 that can be moved into or out of the potentiometer housing. Movement of the shaft 46 changes the resistance between two terminals of the potentiometer 36.

As discussed in further detail below, the potentiometer 36 is connected in series to the snap action switch 38, which acts as an on/off device that allows the potentiometer circuit to be connected to the output of the throttle input device 26 or be disabled, based on the position of the lever 32.

The slider 40 has a threaded connection to one end of the potentiometer's plunging shaft 46. The slider 40 is also connected to the pull cable 44, which is connected to the lever 32. One face of the slider 40 is in contact with the switch 38 when the potentiometer shaft 46 is fully extended. The compression spring 42 is positioned around the pull cable 44 to bias the slider 40 toward the switch 38.

When the motorcycle rider depresses the lever 32, the pull cable 44 pulls the slider 40 away from the switch 38, thereby triggering the switch 38 to close the potentiometer circuit and to connect it to the output of the throttle input device 26. In addition, when the lever 32 is depressed, the potentiometer shaft 46 plunges into the potentiometer housing, thereby changing the resistance between the two terminals of the potentiometer 36. When the lever 32 is released, the compression spring 42 pushes the slider 40 back in contact with the switch 38, which opens the potentiometer circuit, and also gives the rider tactile feedback.

The control device 30 includes an adjustment set screw 48, which pushes against the slider 40. The set screw 48 can be adjusted such that the switch 38 rapidly closes the potentiometer circuit before the potentiometer shaft 46 has a chance to travel a significant distance and thereby produce too drastic a change in resistance. In particular, the set screw 48 is preferably set such that the slider 40 releases the switch 38 as soon as the lever 32 is moved. This provides improved responsive control to the motorcycle rider.

In addition, the shaft 46 of the potentiometer 36 can then be threaded in or out of the slider 40 to yield an appropriate resistance once the switch 38 has been triggered.

Figure 4:
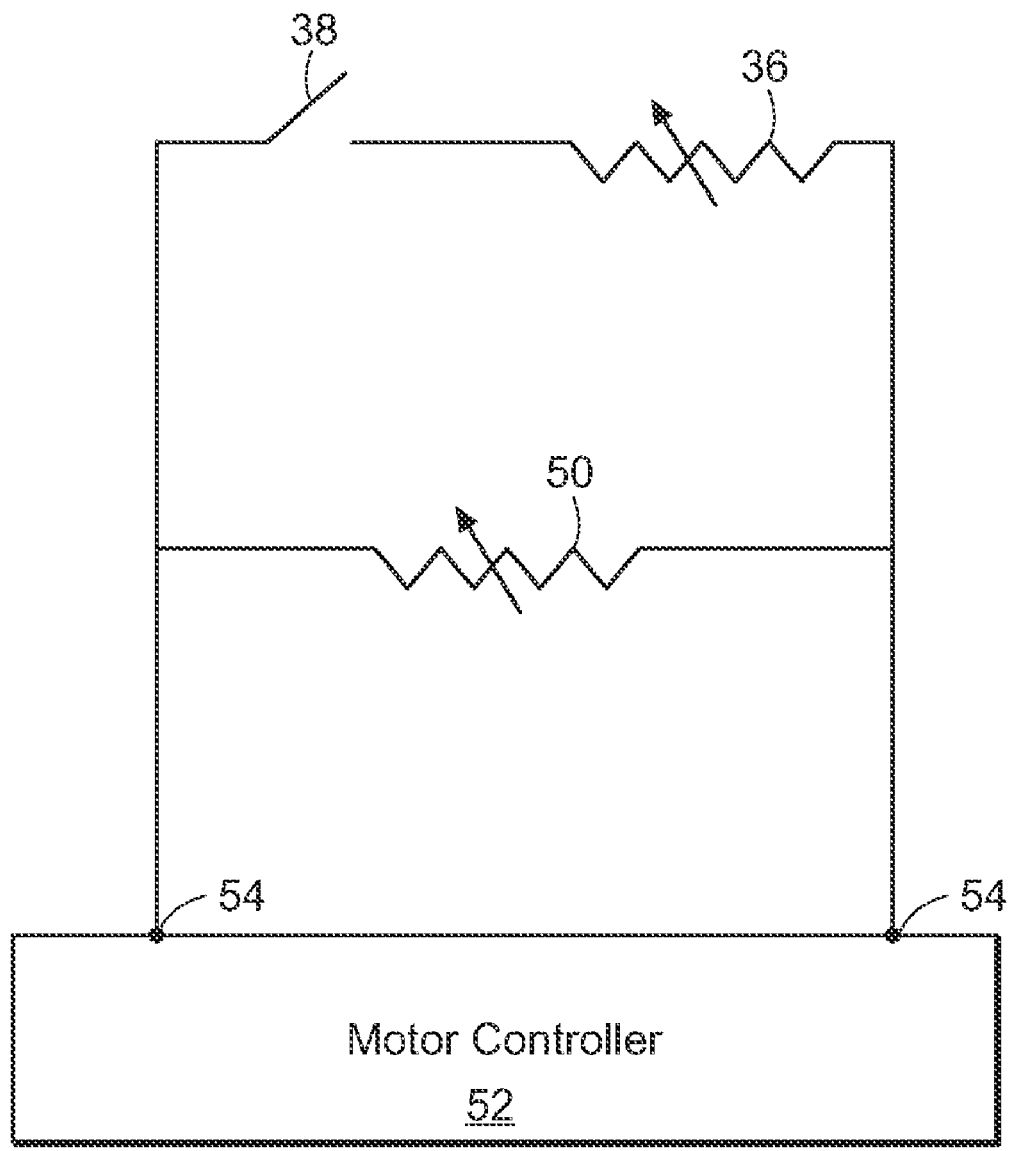
FIG. 4 is a schematic illustration of a control circuit for adjusting the throttle signals in accordance with one or more embodiments of the invention.

FIG. 4 is a schematic diagram illustrating the connection of the control device 30 to the throttle input device 26. The linear potentiometer 36 of the control device 30 is connected in parallel with the potentiometer 50 of the throttle input device 26. The circuit is connected to the motor controller 52 of the electric vehicle at terminals 54.

As shown in FIG. 4, the switch 38 is serially connected to the linear potentiometer 36 of the control device 30. When the lever 32 is fully released or extended, the switch 38 is open, and when the lever 32 is at least partially depressed, the switch 38 is closed.

When the lever 32 is fully released or only very slightly depressed, the linear potentiometer 36 of the control device 30 provides maximum resistance, thereby having no appreciable effect on the output of the throttle input device 26.

As the lever 32 is increasingly further depressed, the linear potentiometer 36 provides proportionately decreasing resistance, thereby causing the throttle signal sent to the motor controller to be adjusted such that the power requested to be sent to the electric vehicle motor 16 is reduced in proportion to the amount the lever 32 is depressed.

When the lever 32 is fully depressed, the linear potentiometer 36 provides minimum or no resistance, thus negating the throttle signal. In this case, no power to the electric motor 16 is requested.

In the embodiment illustrated above, the potentiometer 50 of the throttle input device 26 provides maximum resistance when maximum power is requested, and minimum resistance when no power is requested. Some commercially available throttle input devices work in reverse. The control apparatus 28 described herein can be configured to operate with such throttle input devices. In this case, the linear potentiometer 36 of the control device 30 can be configured to provide minimum resistance when the lever 32 is fully released or only very slightly depressed, and increasing resistance as the lever 32 is increasingly further depressed.

Figure 5:
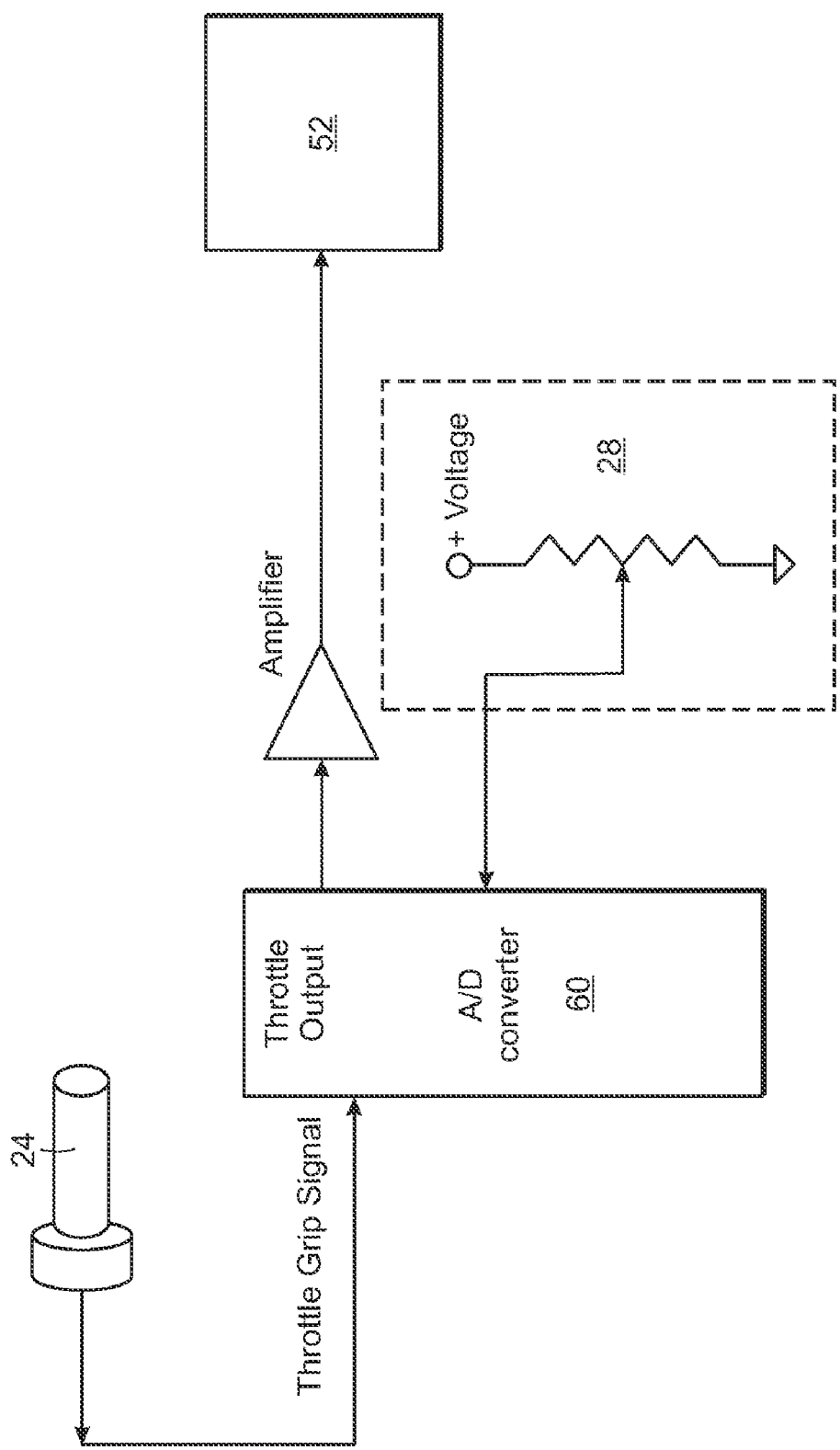
FIG. 5 illustrates a throttle control system using an electronic throttle in accordance with one or more embodiments of the invention.

Some throttle controls for electric vehicles use electronic throttles that generate the throttle signal output using amplifiers instead of resisters. In embodiments employing such electronic throttles, the output from the control apparatus 28 is routed differently to the throttle control than shown in FIG. 4. As shown in FIG. 5, when using an electronic throttle, the voltage output of the control apparatus 28 is routed as a voltage to an analog to digital converter in a throttle control processor 60 of the electronic throttle. The throttle control processor 60 evaluates the voltage presented from the control apparatus 28 with the signal input from the throttle grip 24, and appropriately adjusts the throttle grip signal provided to the motor controller 52.

For traditional mechanical clutches, the control of the clutch by the lever is generally in the mid-range of the full movement of the lever, with both ends of movement having little effect. This is to prevent a light press on the lever accidentally engaging the clutch, and to have full clutch engagement before the lever is completely depressed.

Figure 6:
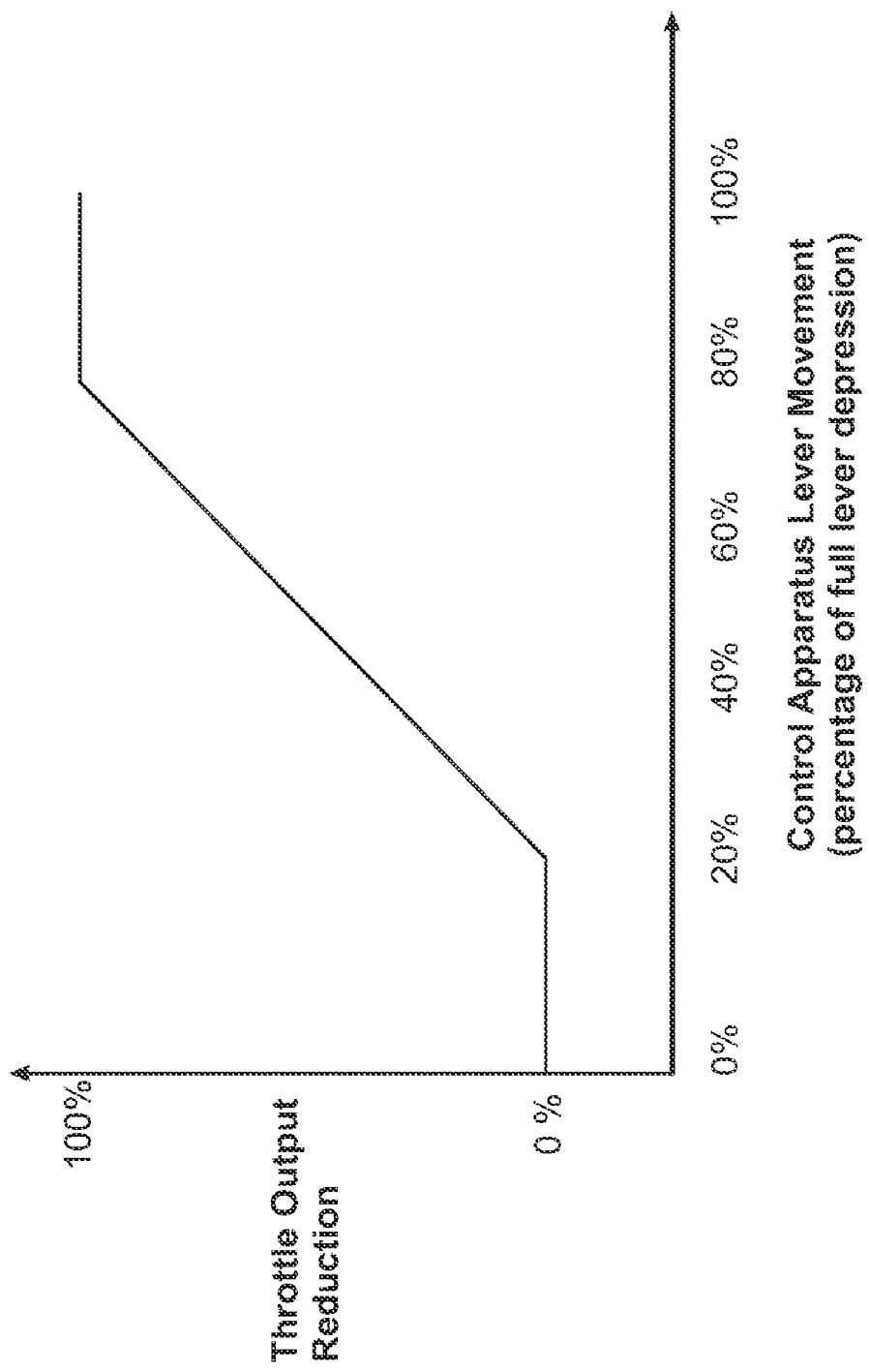
FIG. 6 is a graph illustrating the response of a throttle control processor to lever movement in accordance with one or more embodiments of the invention.

In accordance with one or more embodiments of the invention, this type of traditional control is duplicated in software by the throttle controller. As an example, if the potentiometer of the control apparatus 28 shown in FIG. 5 produces an output with the voltage range from 0V-5V, the throttle control processor 60 can respond accordingly only when the voltage provided by the control apparatus 28 is between 1V-4V (the middle 60% of movement). The first 20% of movement (0V-1V) would not produce any effect to allow light movements on the lever 28 without accidentally affecting the throttle signal. The last 20% (4V-5V) would allow the clutch to be fully engaged without having to have the lever 32 completely depressed. An example of this type of throttle control processor response is illustrated in the graph of FIG. 6. This type of scaling would duplicate typical clutch controls found on traditional motorcycles and other vehicles that use clutch levers.

The control apparatus 28 described herein mimics a hydraulic/mechanical clutch lever of an internal combustion engine motorcycle or scooter. It provides the rider is provided with an additional device with which to control the torque delivery of the electric motor particularly at low motor RPM and low vehicle speeds. The rider can effectively disengage the throttle input while performing braking or at rest similar to the way in which riders of traditional internal combustion engine motorcycles depress the clutch lever during braking. The control apparatus 28 thus provides a solution that fits within the standard use and expectations of motorcyclists experienced with traditional internal combustion engine motorcycles. In addition, by releasing the lever 32 of the control apparatus 28, the rider maintains the ability to use the full power of the vehicle under high-speed use.

Although an electric motorcycle is described in the exemplary embodiments described herein, it should be understood that throttle control systems in accordance with various embodiments can be implemented in a variety of electric vehicles, including three and four wheeled electric vehicles.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. As one particular example, a slide potentiometer containing an integral switch can be used to provide the functionality of the linear potentiometer 36 and the switch 38.

Having described preferred embodiments of the present invention, it should be apparent that modifications can be made without departing from the spirit and scope of the invention.

What is claimed is:

1. In an electric vehicle having a throttle input device operable by a rider for generating a throttle signal for controlling the speed of the electric vehicle, a control apparatus for adjusting the throttle signal, the control apparatus comprising:
   a rider input mechanism that can be gradually manipulated by the rider during operation of the electric vehicle to provide a varying input; and
   a control device coupled to the rider input mechanism and to the output of the throttle input device for adjusting the throttle signal based on the varying input provided by the rider input mechanism.

2. The control apparatus of claim 1 wherein the rider input mechanism comprises a lever positioned on a handlebar of the electric vehicle, wherein the lever can be depressed by the rider to provide the given input.

3. The control apparatus of claim 2 wherein the throttle input device is positioned on a handlebar opposite to the handlebar on which the rider input mechanism is positioned.

4. The control apparatus of claim 2 wherein the throttle signal from the throttle input device is adjusted to reduce the speed of the electric vehicle based on the position of the lever.

5. The control apparatus of claim 2 wherein the throttle signal from the throttle input device is negated when the lever is generally fully depressed.

6. The control apparatus of claim 1 wherein the rider input mechanism mimics a clutch lever of an internal combustion engine vehicle.

7. The control apparatus of claim 6 wherein the control device is configured such that manipulation of the rider input mechanism up to a given range of manipulation results in no adjustment of the throttle signal, and manipulation of the rider input mechanism beyond the given range of manipulation results in no additional adjustment of the throttle signal.

8. The control apparatus of claim 1 wherein the control device comprises a potentiometer forming a variable resistor.

9. The control apparatus of claim 8 further comprising a switch that allows the potentiometer to be connected or disconnected to the output of the throttle input device based on the input provided by the rider input mechanism.

10. The throttle control apparatus of claim 8 further comprising a throttle control processor for receiving and evaluating the output of the potentiometer and the throttle input device and generating an adjusted throttle signal.

11. The control apparatus of claim 1 wherein the control device comprises a pull cable attached to the rider input mechanism, a slider attached to the pull cable, and a linear potentiometer connected to the slider by a plunging shaft, and wherein movement of the pull cable causes the slider to move the plunging shaft into or out of the linear potentiometer to change resistance between two wires extending from the potentiometer.

12. The control apparatus of claim 11 wherein the control device further comprises a compression spring to bias the slider in a given position.

13. The control apparatus of claim 1 wherein the control device forms a variable resistor connected in parallel to a variable resistor of the throttle input device.

14. The control apparatus of claim 1 wherein the electric vehicle is an electric motorcycle.

15. The control apparatus of claim 1 wherein the electric vehicle has three or more wheels.

16. In an electric vehicle having a throttle input device operable by a rider for generating a throttle signal for controlling the speed of the electric vehicle, a control apparatus for adjusting the throttle signal, the control apparatus comprising:
 a rider input mechanism that can be manipulated by the rider to provide a given input, the rider input mechanism comprising a lever positioned on a handlebar of the electric vehicle, wherein the lever can be depressed by the rider to provide the given input; and
 a control device coupled to the rider input mechanism and to the output of the throttle input device for adjusting the throttle signal based on the given input provided by the rider input mechanism, wherein the throttle signal from the throttle input device is adjusted to reduce the speed of the electric vehicle based on the position of the lever.

17. In an electric vehicle having a throttle input device operable by a rider for generating a throttle signal for controlling the speed of the electric vehicle, a control apparatus for adjusting the throttle signal, the control apparatus comprising:
 a rider input mechanism that can be manipulated by the rider to provide a given input, the rider input mechanism comprising a lever positioned on a handlebar of the electric vehicle, wherein the lever can be depressed by the rider to provide the given input; and
 a control device coupled to the rider input mechanism and to the output of the throttle input device for adjusting the throttle signal based on the given input provided by the rider input mechanism, wherein the throttle signal from the throttle input device is negated when the lever is generally fully depressed.

18. In an electric vehicle having a throttle input device operable by a rider for generating a throttle signal for controlling the speed of the electric vehicle, a control apparatus for adjusting the throttle signal, the control apparatus comprising:
 a rider input mechanism that can be manipulated by the rider to provide a given input; and
 a control device coupled to the rider input mechanism and to the output of the throttle input device for adjusting the throttle signal based on the given input provided by the rider input mechanism, wherein the control device comprises a potentiometer forming a variable resistor.

19. The control apparatus of claim 18 further comprising a switch that allows the potentiometer to be connected or disconnected to the output of the throttle input device based on the input provided by the rider input mechanism.

20. The throttle control apparatus of claim 18 further comprising a throttle control processor for receiving and evaluating the output of the potentiometer and the throttle input device and generating an adjusted throttle signal.

21. In an electric vehicle having a throttle input device operable by a rider for generating a throttle signal for controlling the speed of the electric vehicle, a control apparatus for adjusting the throttle signal, the control apparatus comprising:
 a rider input mechanism that can be manipulated by the rider to provide a given input; and
 a control device coupled to the rider input mechanism and to the output of the throttle input device for adjusting the throttle signal based on the given input provided by the rider input mechanism, wherein the control device comprises a pull cable attached to the rider input mechanism, a slider attached to the pull cable, and a linear potentiometer connected to the slider by a plunging shaft, and wherein movement of the pull cable causes the slider to move the plunging shaft into or out of the linear potentiometer to change resistance between two wires extending from the potentiometer.

22. The control apparatus of claim 21 wherein the control device further comprises a compression spring to bias the slider in a given position.

23. In an electric vehicle having a throttle input device operable by a rider for generating a throttle signal for controlling the speed of the electric vehicle, a control apparatus for adjusting the throttle signal, the control apparatus comprising:
 a rider input mechanism that can be manipulated by the rider to provide a given input; and
 a control device coupled to the rider input mechanism and to the output of the throttle input device for adjusting the throttle signal based on the given input provided by the rider input mechanism, wherein the control device forms a variable resistor connected in parallel to a variable resistor of the throttle input device.

* * * * *